(12) United States Patent
Yamane

(10) Patent No.: US 11,396,039 B2
(45) Date of Patent: Jul. 26, 2022

(54) FASTENING SYSTEM AND FASTENING METHOD

(71) Applicant: MITSUBISHI HEAVY INDUSTRIES, LTD., Tokyo (JP)

(72) Inventor: Shigemi Yamane, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 194 days.

(21) Appl. No.: 16/961,038

(22) PCT Filed: Mar. 22, 2019

(86) PCT No.: PCT/JP2019/012108
§ 371 (c)(1),
(2) Date: Jul. 9, 2020

(87) PCT Pub. No.: WO2019/188789
PCT Pub. Date: Oct. 3, 2019

(65) Prior Publication Data
US 2020/0368806 A1    Nov. 26, 2020

(30) Foreign Application Priority Data
Mar. 27, 2018    (JP) .............................. JP2018-059928

(51) Int. Cl.
*B21J 15/20*    (2006.01)
*B21J 15/02*    (2006.01)
(Continued)

(52) U.S. Cl.
CPC ............. *B21J 15/20* (2013.01); *B21J 15/022* (2013.01); *B64F 5/10* (2017.01); *F16B 19/05* (2013.01);
(Continued)

(58) Field of Classification Search
CPC ........ B21J 15/20; B21J 15/022; B21J 15/142; B21J 15/147; B64F 5/10; F16B 19/05;
(Continued)

(56) References Cited

FOREIGN PATENT DOCUMENTS

| GB | 2050907 A | 1/1981 | |
|---|---|---|---|
| JP | S639126 B2 | 2/1988 | |
| KR | 101295258 B1 * | 8/2013 | .............. B21J 15/20 |

OTHER PUBLICATIONS

Jeong Chi Pyo, KR-101295258-B1 Machine Translation (Year: 2013).*
International Search Report and Written Opinion of International Application No. PCT/JP2019/012108 dated Jun. 11, 2019; 11pp.

* cited by examiner

*Primary Examiner* — Lee A Holly
(74) *Attorney, Agent, or Firm* — Kanesaka Berner and Partners LLP

(57) ABSTRACT

A fastening system includes a plurality of fasteners having different sizes, and is provided with a pressurizing pump which pressurizes a fluid to a prescribed pressure, a plurality of pressurizing units which each have a pressure receiving surface, are each disposed in a position capable of pressurizing each respective fastener, and which receive the fluid on the pressure receiving surface to pressurize each fastener. A supply system includes a base end connected to the pressurizing pump and a plurality of branch ends connected to each pressurizing unit, which branches from the base end toward the branch ends, and which is capable of supplying the fluid from the base end throughout the branch ends. Each pressure receiving surface has an individual pressure receiving surface area corresponding to the corresponding size, and the fluid is supplied at the prescribed pressure from the base end throughout the pressure receiving surfaces.

6 Claims, 6 Drawing Sheets

(51) Int. Cl.
*F16B 19/05* (2006.01)
*B64F 5/10* (2017.01)
*B64C 1/00* (2006.01)
*B64C 3/26* (2006.01)
*B21J 15/14* (2006.01)

(52) U.S. Cl.
CPC ............... *B21J 15/142* (2013.01); *B64C 1/00* (2013.01); *B64C 3/26* (2013.01); *B64C 2001/0054* (2013.01)

(58) Field of Classification Search
CPC ... F16B 1/005; B64C 1/00; B64C 3/26; B64C 2001/0054
See application file for complete search history.

FIG. 5

<UNIFIED PRESSURIZING PUMP UNIT>

| FASTENER SIZE | PREDETERMINED PRESSURE (kg/cm$^2$) | PRESSURE RECEIVING AREA (cm$^2$) | THRUST (kg) | NUMBER OF PUMP UNITS |
|---|---|---|---|---|
| A | 459 | 5.003 | 2296 | 1 (FIXED) |
| B | 459 | 5.003 | 2296 | |
| C | 459 | 8.042 | 3691 | |
| D | 459 | 11.404 | 5234 | |
| E | 459 | 11.31 | 5191 | |

FIG. 6

<INDIVIDUAL PUMP UNIT (COMPARATIVE EXAMPLE)>

| FASTENER SIZE | PREDETERMINED PRESSURE (kg/cm$^2$) | PRESSURE RECEIVING AREA (cm$^2$) | THRUST (kg) | NUMBER OF PUMP UNITS |
|---|---|---|---|---|
| A | 190 | 7.2 | 1371 | 2 |
| B | 274 | 7.2 | 1977 | 19 |
| C | 218 | 12.1 | 2636 | 16 |
| D | 338 | 12.1 | 4088 | 14 |
| E | 281 | 15.9 | 4474 | 8 |

FASTENING SYSTEM AND FASTENING METHOD

RELATED APPLICATIONS

The present application is a National Phase of International Application Number PCT/JP2019/012108 filed Mar. 22, 2019 and claims priority to Japanese Application Number 2018-059928 filed Mar. 27, 2018.

TECHNICAL FIELD

The present invention relates to a fastening system and a fastening method.

Priority is claimed on Japanese Patent Application No. 2018-059928 filed on Mar. 27, 2018, the content of which is incorporated herein by reference.

BACKGROUND ART

In a structure such as a fuselage and a wing of an aircraft, a plurality of members are coupled to each other by an adhesive agent or a fastener. As the fastener, for example, a fastener having a pin and a collar is used. In a case of using the fastener, the plurality of members are fastened to each other as the pin and the collar caulk each other by a fastening system.

For example, PTL 1 discloses a fastening system in which a pull gun, which is a pressurizing section, pulls a pin, a force is applied to press a collar mounted on the pin, and a plurality of members are fastened to each other.

CITATION LIST

Patent Literature
[PTL 1] Japanese Examined Patent Application Publication No. 63-9126

SUMMARY OF INVENTION

Technical Problem

Among the plurality of members configuring an assembly structure, there are members fastened to each other by a plurality of fasteners having fastener sizes different from each other.

In order to fasten a plurality of such members to each other with the fasteners, it is necessary to apply different forces to the pin and collar in accordance with each fastener size. For this reason, it is necessary to move the pressurizing section and a pump unit which are suitable for each fastener size to positions where each fastener of the assembly structure can be accessed.

Therefore, the movement of the pressurizing section and the pump unit is burden of fastening operation.

The present invention is devised in order to solve the problems, and an object thereof is to provide a fastening system and a fastening method which allow reducing burden of fastening operation.

Solution to Problem

According to a first aspect, there is provided a fastening system that fastens a plurality of members to each other with a plurality of fasteners having fastener sizes different from each other. The fastening system includes a pressurizing pump that pressurizes a fluid to a set predetermined pressure, a plurality of pressurizing sections that each have a pressure receiving surface, each are disposed at a position where each of the fasteners is able to be pressurized, and receive the fluid with each of the pressure receiving surfaces to pressurize each of the fasteners, and a supply system that has a base end connected to the pressurizing pump and a plurality of branch ends connected to the pressurizing sections respectively, branches off from the base end toward the respective branch ends, and is capable of supplying the fluid from the base end to the respective branch ends. Each of the pressure receiving surfaces has an individual pressure receiving area according to the corresponding fastener size. The fluid is supplied at the predetermined pressure from the base end to each of the pressure receiving surfaces.

In the aspect, the fluid can be supplied at the predetermined pressure to the pressure receiving surfaces of the plurality of pressurizing sections disposed at positions where the respective fasteners can be fastened. For this reason, operation of moving the pressurizing section and the pump to the positions where the respective fasteners can be fastened is reduced. Therefore, burden of the fastening operation can be reduced.

The fastening system of a second aspect is the fastening system of the first aspect, in which the fastener has a pin and a collar, and the pressurizing section pulls the pin and caulks the collar.

The fastening system of a third aspect is the fastening system of the first aspect or the second aspect, in which the predetermined pressure is maintained at a set lower limit value or higher.

The fastening system of a fourth aspect is the fastening system of any one of the first to third aspects, in which the pressurizing pump performs pressurization when the predetermined pressure is lower than a set lower limit value.

The fastening system of a fifth aspect is the fastening system of any one of the first to fourth aspects, in which each of the members is a composite material.

According a sixth aspect, there is provided a fastening method of fastening a plurality of members to each other with a plurality of fasteners having fastener sizes different from each other, by using a fastening system including a pressurizing pump that pressurizes a fluid, a plurality of pressurizing sections that each have a pressure receiving surface, each are disposed at a position where each of the fasteners is able to be pressurized, and receive the fluid with each of the pressure receiving surfaces to pressurize each of the fasteners, and a supply system that has a base end connected to the pressurizing pump and a plurality of branch ends connected to the pressurizing sections respectively, branches off from the base end toward the respective branch ends, and is capable of supplying the fluid from the base end to the respective branch ends, in which each of the pressure receiving surfaces has an individual pressure receiving area according to the corresponding fastener size. The fastening method includes a step of pressurizing the fluid to a set predetermined pressure with the pressurizing pump and a step of supplying the fluid at the predetermined pressure from the base end to each of the pressure receiving surfaces and fastening the plurality of members to each other with each of the fasteners.

In the aspect, the fluid can be supplied at the predetermined pressure to the pressure receiving surfaces of the plurality of pressurizing sections disposed at positions where the respective fasteners can be fastened. For this reason, operation of moving the pressurizing section and the pump to the positions where the respective fasteners can be fastened is reduced. Therefore, burden of the fastening operation can be reduced.

Advantageous Effects of Invention

According to the aspect, the burden of the fastening operation can be reduced.

BRIEF DESCRIPTION OF DRAWINGS

FIG. 5 is a table showing a relationship among a fastener size, a pressure receiving area, and thrust in the embodiment.

FIG. 6 is a table showing a relationship among a fastener size, a pressure receiving area, and thrust in a comparative example.

DESCRIPTION OF EMBODIMENTS

<Embodiment>

Hereinafter, a fastening system according to an embodiment of the present invention will be described with reference to FIGS. 1 to 8.

A fastening system 1 of the embodiment is for fastening a plurality of members to each other with a plurality of fasteners having fastener sizes different from each other.

(Configuration)

Figure 1:
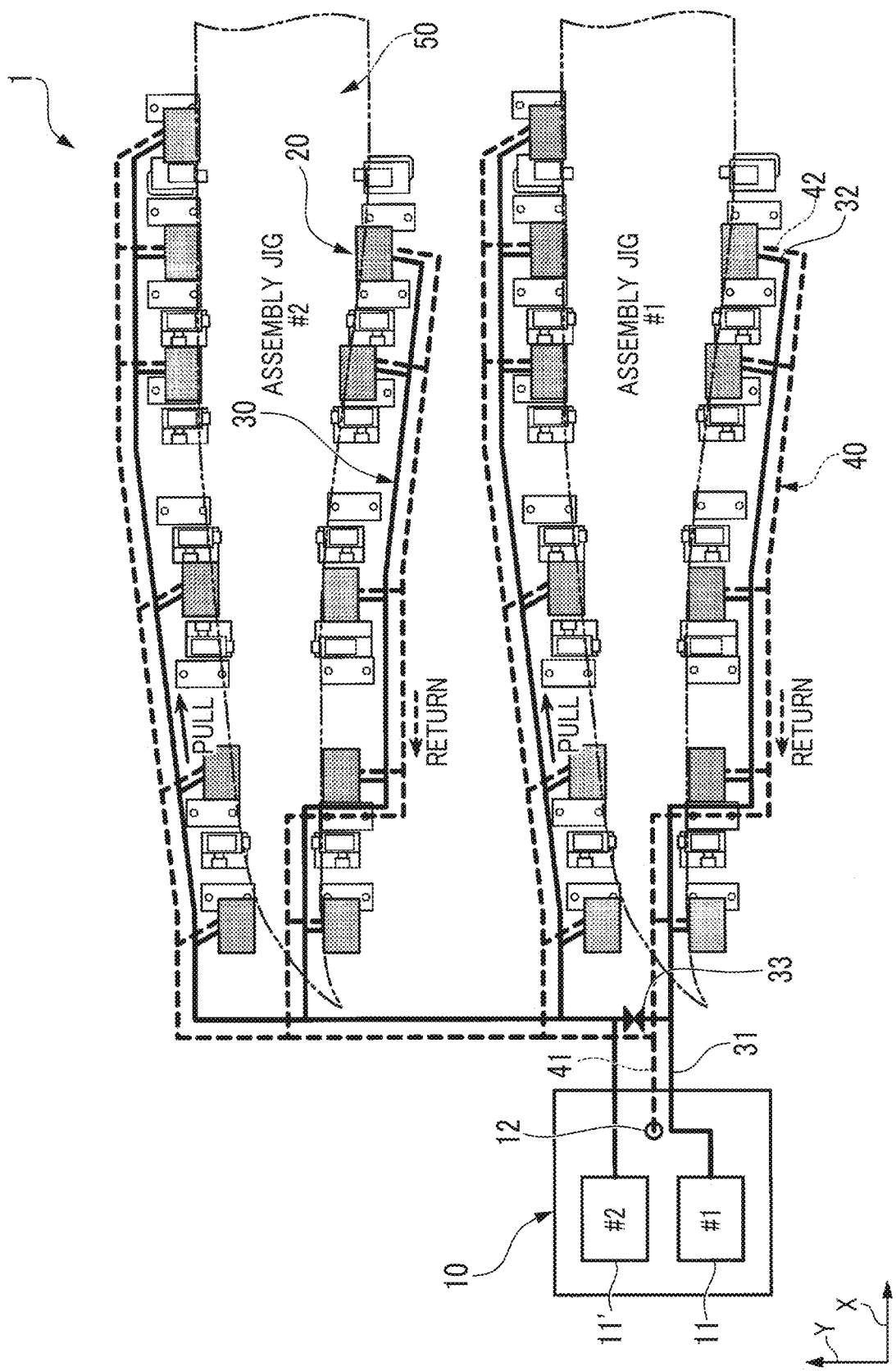
FIG. 1 is a schematic view of an entire fastening system according to an embodiment.

As illustrated in FIG. 1, the fastening system 1 includes a centralized pump unit 10, a plurality of pressurizing sections 20, a supply system 30, and a return system 40. The fastening system 1 fastens a plurality of composite materials 50, which are a plurality of members, to each other.

The centralized pump unit 10 includes a pressurizing pump 11, a pressurizing pump 11', and a return port 12.

The pressurizing pump 11 and the pressurizing pump 11' are connected to the supply system 30. The pressurizing pump 11 and the pressurizing pump 11' can pressurize an oil which is a fluid at a set predetermined pressure Pd. The pressurizing pump 11 and the pressurizing pump 11' can supply the oil to the supply system 30 at the predetermined pressure Pd.

The centralized pump unit 10 has two supply pressure pump motors according to specifications. The return system 40 returns the oil to the centralized pump unit 10 with no load. In addition, as illustrated in FIG. 1, it is also possible for the pressurizing pump 11 and the pressurizing pump 11' to supply a pressure to both of an assembly jig #1 and an assembly jig #2 respectively through a switching valve 33. This is devised not to stop the production of one of the assembly jigs in a case where the other becomes inoperable due to a trouble.

The return port 12 is connected to the return system 40 and can bring the oil to the centralized pump unit 10.

Hereinafter, out of the pressurizing pump 11 and the pressurizing pump 11', the pressurizing pump 11 will be described, but the same applies to the pressurizing pump 11'.

The supply system 30 has a base end 31 and a plurality of branch ends 32.

The base end 31 is connected to the pressurizing pump 11. The branch ends 32 are connected to the corresponding pressurizing sections 20 respectively.

The supply system 30 extends over an XY-plane. The supply system 30 branches off from the base end 31 toward the respective branch ends 32. The pressurizing pump 11 is configured to be capable of supplying an oil pressurized at the predetermined pressure Pd from the base end 31 to each of the branch ends 32.

The return system 40 has a base end 41 and a plurality of branch ends 42.

The base end 41 is connected to the return port 12. The branch ends 42 are connected to the corresponding pressurizing sections 20 respectively.

The return system 40 extends over the XY-plane. The return system 40 branches off from the base end 41 toward the respective branch ends 42.

The plurality of pressurizing sections 20 are disposed at positions where respective fasteners 60 can be pressurized.

Figure 2:
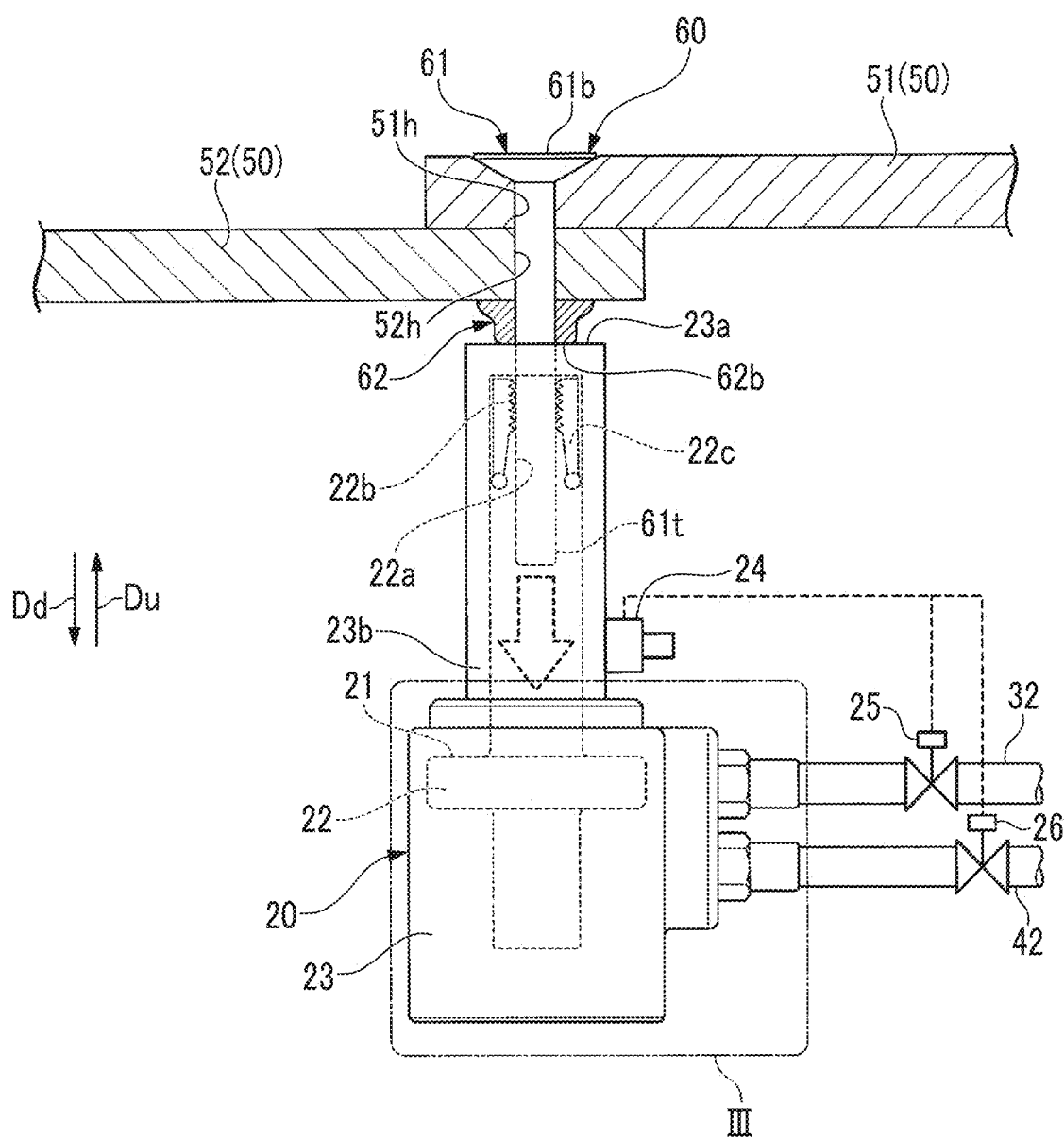
FIG. 2 is a side view of a (straight type) pressurizing section according to the embodiment.

As illustrated in FIG. 2, each of the pressurizing sections 20 includes a drive unit 22 having a pressure receiving surface 21, a housing 23, and a clamp portion 22b. Each of the pressure receiving surfaces 21 has a pressure receiving area Sr. Each of the pressure receiving surfaces 21 has the individual pressure receiving area Sr according to the corresponding fastener size.

The clamp portion 22b has a recessed portion 22a extending in a downward direction Dd. The clamp portion 22b grips a tip 61t of a pin 61 fitted in the recessed portion 22a, and pulls the tip 61t of the pin 61 in the downward direction Dd through driving of the drive unit 22.

The clamp portion 22b can grip the tip 61t of the pin 61 as a split pin or the recessed portion 22a is formed into a screw shape.

In the embodiment, the clamp portion 22b has a pin clamp 22c as illustrated in FIG. 2. The pin clamp 22c is a clamp claw, and can grip the tip 61t of the pin 61 fitted in the recessed portion 22a.

As illustrated in FIG. 2, the composite material 50 has a first composite material 51 and a second composite material 52. In the embodiment, the composite material 50 is a member that configures a wing part or a main body of an aircraft.

The first composite material 51 has a panel shape. The first composite material 51 has a first hole 51h penetrating a pair of panel surfaces.

The second composite material 52 has a panel shape. The second composite material 52 has a second hole 52h penetrating a pair of panel surfaces.

The fastener 60 has the pin 61 and a collar 62.

The pin 61 has a shape extending in an axial direction from a base portion 61b toward the tip 61t.

The collar 62 is fitted to the pin 61. The pin clamp 22c clamps the pin 61. A pressure is applied to the pressure receiving surface 21. As the drive unit 22 operates, the housing 23 (an abutting surface 23a to be described later) squeezes the collar 62 fitted to the pin 61 to come into close contact with the second composite material 52 by the reaction force. The collar 62 caulks the pin 61.

In a case where the first composite material 51 and the second composite material 52 are coupled to each other, the fastener 60 allows the pin 61 and the collar 62 to be fitted from a first composite material 51 side and from a second composite material 52 side into the first hole 51h and the second hole 52h respectively, such that the first hole and the second hole are penetrated. Accordingly, as the first composite material 51 and the second composite material 52 are sandwiched from both sides between the pin 61 and the collar 62 and the pin 61 is fitted into the collar 62, the fastener 60 fastens the first composite material 51 and the second composite material 52 to each other.

At this time, since the base portion 61*b* of the pin 61 is increased in diameter, the pin 61 presses the first composite material 51 from above when the pin 61 is fitted into the collar 62 from above the first composite material 51 in the downward direction Dd. On the other hand, the collar 62 presses the second composite material 52 from below in an upward direction Du.

Further, when the tip 61*t* of the pin 61 protruding from a base portion 62*b* of the collar 62 is pulled in the downward direction Dd with respect to the collar 62, the collar 62 is inserted into a gap between the first and second holes 51*h* and 52*h* and the pin 61 while deforming. Accordingly, the fastener 60 can fasten the first composite material 51 and the second composite material 52 to each other.

The pin 61 has a broken portion at the tip 61*t*, and is configured such that the tip 61*t* of the pin 61 is torn when thrust is equal to or greater than a force required to fasten the first composite material 51 and the second composite material 52 to each other.

The configuration of the pressurizing section 20 will be described in detail.

The pressurizing section 20 further includes a switch 24, a supply valve 25, and a return valve 26.

The branch end 32 of the supply system 30 is connected to the supply valve 25. The branch end 42 of the return system 40 is connected to the return valve 26.

The switch 24 can switched between on and off.

When the switch 24 is turned on, the supply valve 25 and the return valve 26 are opened. When the supply valve is opened, an oil pressurized at the predetermined pressure Pd is supplied from the branch end 32 to the pressurizing section 20, and the oil is supplied to the pressure receiving surface 21 at the predetermined pressure Pd. When the return valve 26 is opened, the oil, which is discharged from the pressurizing section 20 with the supply of the oil to the pressure receiving surface 21, is discharged to the base end 41.

When the switch 24 is turned off, the supply valve 25 and the return valve 26 are closed.

The housing 23 includes a main body portion 23*b* having the abutting surface 23*a*.

The main body portion 23*b* accommodates the drive unit 22 therein.

The abutting surface 23*a* is an end surface formed on an upper end of the main body portion 23*b*. The abutting surface 23*a* abuts against the base portion 62*b* of the collar 62.

Figure 3:
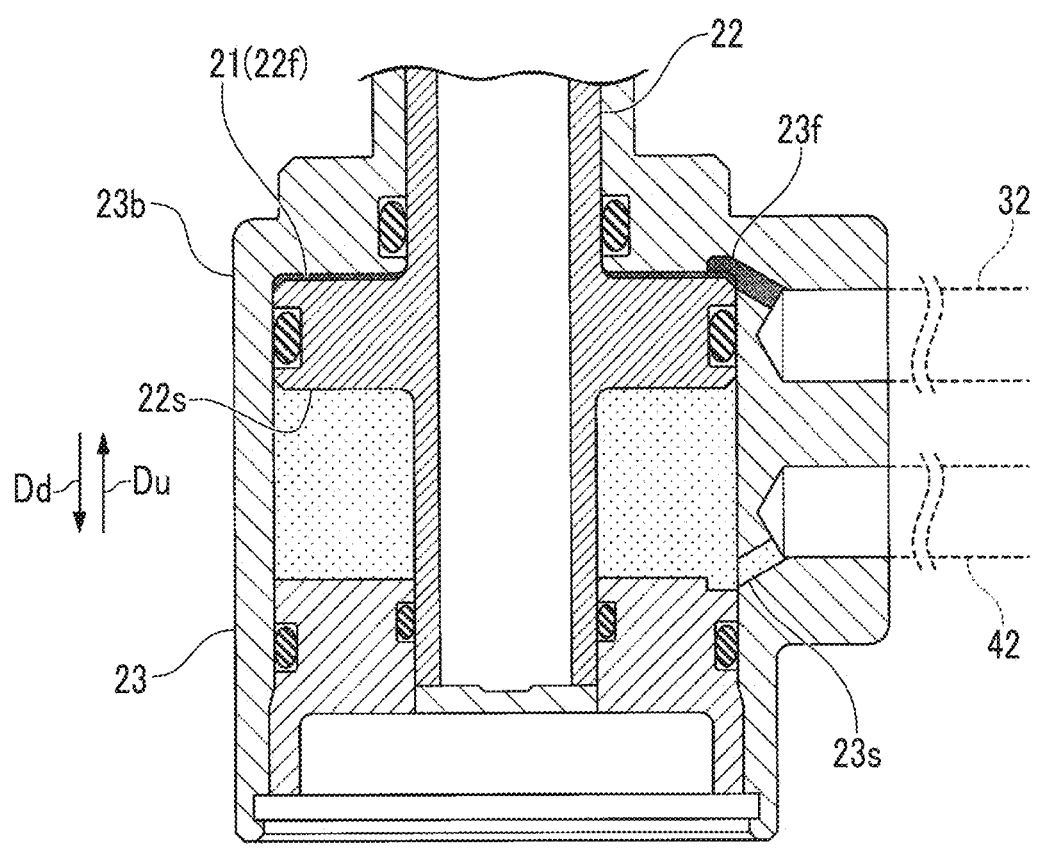
FIG. 3 is an enlarged sectional view of a part III of FIG. 2 having a surface including a cylinder shaft as a section (before pressurization).

Configurations of the drive unit 22 and the housing 23 of the pressurizing section 20 will be described in further detail with reference to FIG. 3.

The drive unit 22 further has a first surface 22*f* and a second surface 22*s*. The first surface 22*f* and the second surface 22*s* are formed in the housing 23.

The first surface 22*f* functions as the pressure receiving surface 21 of the pressurizing section 20. Therefore, the first surface 22*f* is a surface that faces the upward direction Du and is a surface having the pressure receiving area Sr.

The second surface 22*s* is a surface that forms a back surface of the first surface 22*f*, and faces the downward direction Dd.

The housing 23 further has a first opening 23*f* and a second opening 23*s*.

The first opening 23*f* is open toward the first surface 22*f* of the drive unit 22 provided inside the main body portion 23*b*.

The first opening 23*f* is connected to the branch end 32 of the supply system 30. For this reason, an oil is injected into the first opening 23*f* at the predetermined pressure Pd.

Figure 4:
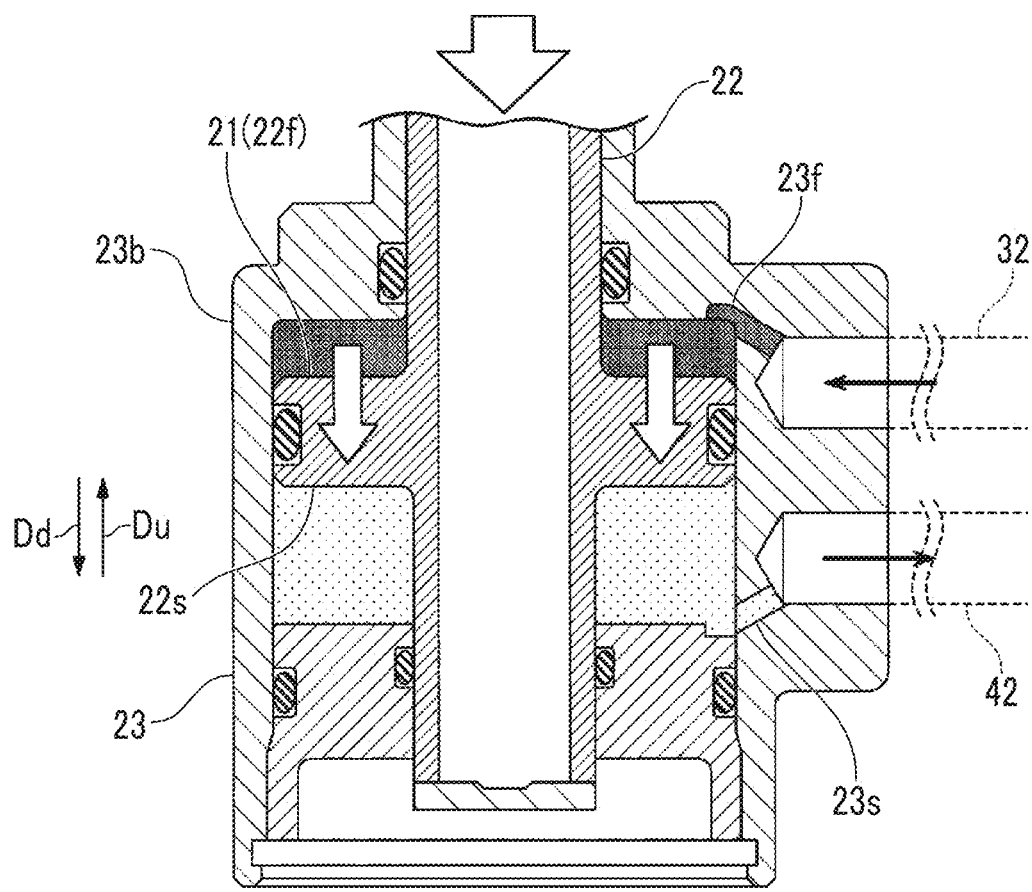
FIG. 4 is an enlarged sectional view of the part III of FIG. 2 having the surface including the cylinder shaft as the section (during pressurization).

The pressurizing section 20 has a sealed structure between the first opening 23*f* and the first surface 22*f* of the drive unit 22. For this reason, when an oil is pressurized and injected from the first opening 23*f*, the oil presses the first surface 22*f* functioning as the pressure receiving surface 21, thereby driving the drive unit 22 in the downward direction Dd as illustrated in FIG. 4.

At this time, when the oil is injected at the predetermined pressure Pd, the drive unit 22 is driven in the downward direction Dd by thrust corresponding to the product of an area of the pressure receiving surface 21 (the first surface 22*f*) and the predetermined pressure Pd.

The second opening 23*s* is open toward the second surface 22*s* of the drive unit 22 provided inside the main body portion 23*b*. The pressurizing section 20 has a sealed structure between the second opening 23*s* and the second surface 22*s* of the drive unit 22.

(Relationship among Fastener Size, Pressure Receiving Area, and Thrust)

In the case of the embodiment, as shown in FIG. 5, each of the pressure receiving surfaces 21 has the individual pressure receiving area Sr according to the fastener size of each of the corresponding fasteners 60.

Herein, the term "individual" means that the unique pressure receiving area Sr is set for the fastener 60 having each fastener size, and means that the same pressure receiving area Sr is set for at least the same fastener size. Also in the case shown in FIG. 5, a unique pressure receiving area is set for the fastener 60 having each fastener size.

In this case, the unique pressure receiving area Sr may be set, and the same pressure receiving area Sr may be set for the fasteners 60 having fastener sizes different from each other just as the same pressure receiving area (=5.003 $cm^2$) is set for a "fastener size=A" and a "fastener size=B". It is also evident that pressure receiving areas different from each other may be set.

In FIG. 5, the fastener size indicates an outer diameter of the fastener. The fastener sizes are A, B, C, D, and E in ascending order.

Since the unique pressure receiving area Sr is set for the fastener 60 having each fastener size, the pressure receiving surface 21 having each pressure receiving area can receive individual thrust in the downward direction Dd simply by pressurizing at the same predetermined pressure Pd as shown in FIG. 5.

Further, in the case of the embodiment, as described above, among the pressurizing sections 20, there are the pressurizing sections 20 in which the pressure receiving areas Sr of the pressure receiving surfaces 21 differ according to the corresponding fastener sizes.

In the case shown in FIG. 5, for example, the pressurizing section 20 having the pressure receiving surface 21 with the "pressure receiving area=5.003 $cm^2$" is disposed for the fastener 60 with the "fastener size=A" (or the "fastener size=B"), and the pressurizing section 20 having the pressure receiving surface 21 with the "pressure receiving area=8.042 $cm^2$" is disposed for the fastener 60 having the "fastener size=C".

As shown in FIG. 5, the pump unit of the fastening system 1 of the embodiment adopts a "unified pressurizing pump unit" in which the pump units of the respective pressurizing sections 20 are unified. For this reason, the number of pump units of the fastening system 1 is one centralized pump unit 10, and fastening operation can be performed with the number of the pump unit fixed.

In a comparative example, in a case where the fastening system adopts an "individual pump unit" in which each pressurizing section has an individual pump unit, it is necessary for an operator to carry around the number of pump units shown in FIG. 6 to perform the fastening operation.

Figure 7:
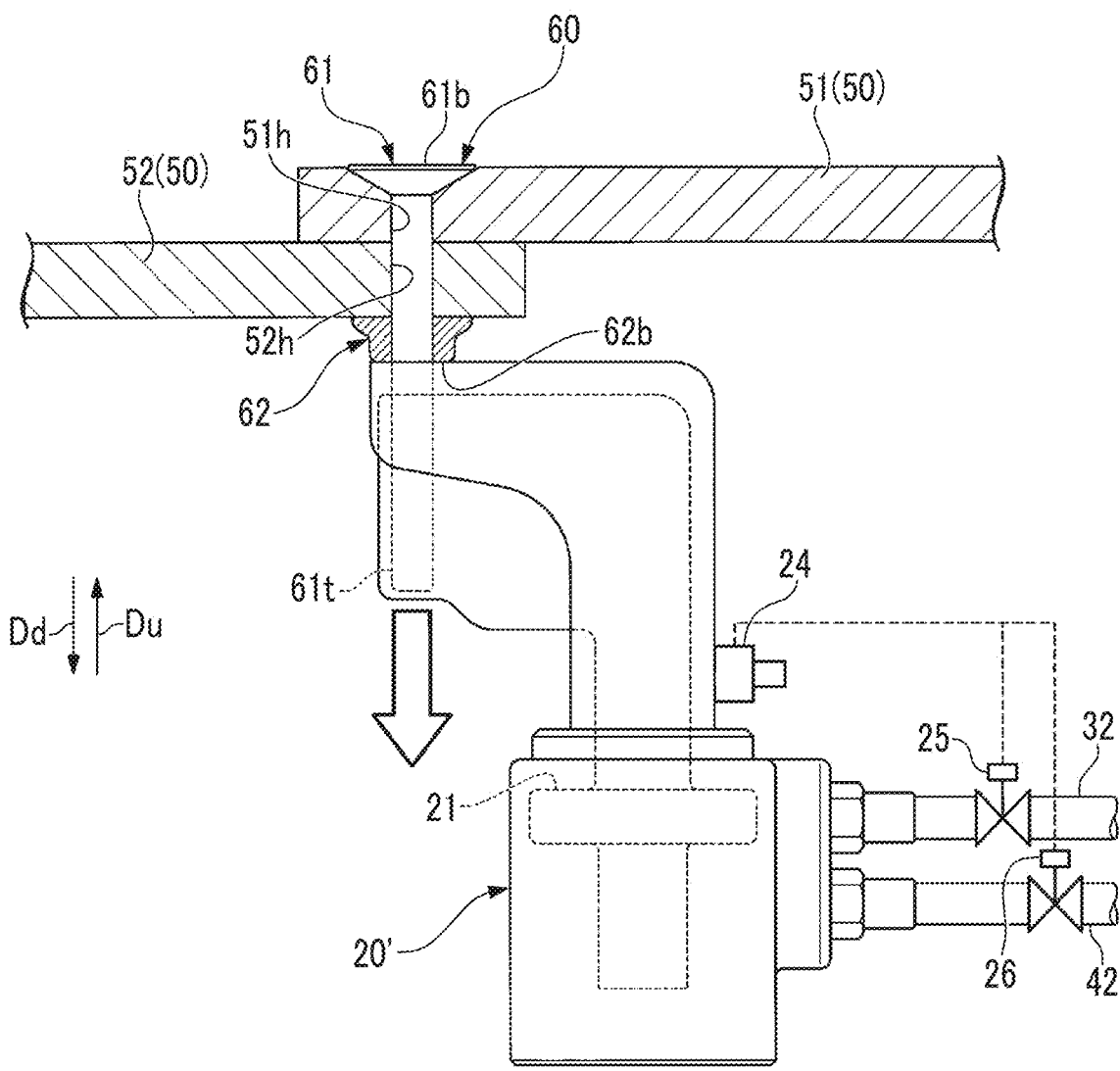
FIG. 7 is a side view of a (offset type) pressurizing section according to a modification example of the embodiment.

Although the pressurizing section 20 is a straight type pull gun as illustrated in FIG. 2 in the embodiment, the pressurizing section may be an offset type pull gun which is a different type, just as a pressurizing section 20' illustrated in FIG. 7 in a modification example.

(Fastening Method)

Figure 8:
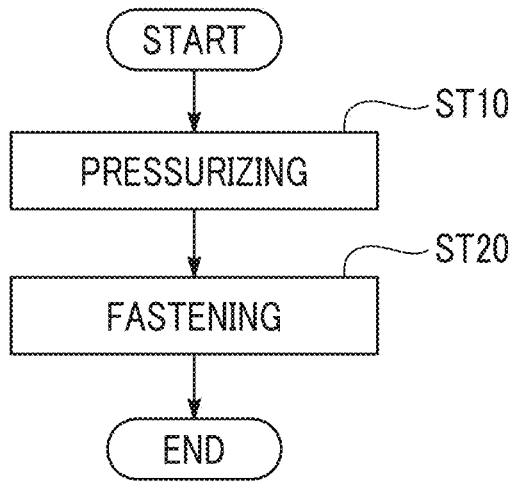
FIG. 8 is a flowchart of a fastening method according to the embodiment.

A fastening method in which the fastening system 1 is used will be described with reference to FIG. 8.

First, the pressurizing pump 11 of the fastening system 1 pressurizes an oil at the predetermined pressure Pd (ST10: step of pressurizing). Then, the pressurized oil is supplied to the base end 31 of the supply system 30. In the case of the embodiment, when the oil is supplied to the base end 31 of the supply system 30, the oil is supplied at the predetermined pressure Pd from the base end 31 to each of the branch ends 32 of the supply system 30.

Next, the oil is supplied at the predetermined pressure Pd from the base end 31 to each of the pressure receiving surfaces 21, and the plurality of composite materials 50 are fastened to each other by each of the fasteners 60 (ST20: step of fastening). In the case of the embodiment, the supply valve 25 is opened as the operator turns on the switch 24 in each of the pressurizing sections 20. Accordingly, the oil supplied to each of the branch ends 32 is supplied at the predetermined pressure Pd from the base end 31 to each of the pressure receiving surfaces 21.

The oil supplied to the pressure receiving surface 21 at the predetermined pressure Pd presses the pressure receiving surface 21 in the downward direction Dd at the predetermined pressure Pd.

When the pressure receiving surface 21 is pressed at the predetermined pressure Pd, the drive unit 22 is driven in the downward direction Dd by thrust corresponding to the product of the area of the pressure receiving surface 21 and the predetermined pressure Pd. As shown in FIG. 5, since the thrust of the drive unit 22 differs when the pressure receiving area Sr differs, the drive unit 22 is driven in the downward direction Dd by thrust according to the fastener size of the fastener 60, thereby pulling the tip 61t of the pin 61 in the downward direction Dd. At this time, the collar 62 abuts against the abutting surface 23a of the housing 23 and does not move in the downward direction Dd.

When the tip 61t of the pin 61 is pulled in the downward direction Dd with respect to the collar 62, the fastener 60 fastens the first composite material 51 and the second composite material 52 to each other.

When the first composite material 51 and the second composite material 52 are fastened to each other, the tip 61t of the pin 61 is pulled by the pressurizing section 20 with further thrust and is torn off.

When the operator turns on the switch 24, the return valve 26 is also opened. When the return valve 26 is also opened in a case where an oil fills from the second surface 22s to the second opening 23s, the oil is discharged from the second opening 23s to the return port 12 via the return system 40 through driving of the drive unit 22 in the downward direction Dd.

After fastening the composite materials 50, the operator turns off the switch 24 and ends the operation.

The pressurizing pump 11 may be stopped after temporarily pressurizing the inside of the supply system 30 at the predetermined pressure Pd. In this case, when a pressure in the supply system 30 declines below the set predetermined pressure Pd during the fastening operation, the pressurizing pump is operated again, and the pressure in the supply system 30 is again increased to the predetermined pressure Pd.

As shown in FIG. 5, the pressurizing pump 11 sets the predetermined pressure Pd to 459 kg/cm$^2$ (45.0 MPa) in the embodiment.

(Workings and Effects)

The fastening system 1 of the embodiment can supply an oil at the predetermined pressure Pd to the pressure receiving surfaces 21 of the plurality of pressurizing sections 20 disposed at positions where the respective fasteners 60 can be fastened. Further, each of the pressure receiving surfaces 21 has the individual pressure receiving area Sr according to the corresponding fastener size, and the oil is supplied at the predetermined pressure Pd from the base end 31 of the supply system 30 to each pressure receiving surface.

For this reason, even in a case where the plurality of members are fastened to each other by the plurality of fasteners 60 having fastener sizes different from each other, the members can be fastened to each other by the plurality of fasteners 60 with the plurality of pressurizing sections and the pressurizing pump 11 fixed and disposed respectively.

Therefore, operation of moving the pressurizing section 20 and the pressurizing pump 11 to a position where each of the fasteners 60 can be fastened can be reduced, and burden of the fastening operation can be reduced.

Further, in the embodiment, the fastening system 1 can drive the drive unit 22 of each of the pressurizing sections 20 with individual thrust while uniformly supplying an oil at the predetermined pressure Pd from the pressurizing pump 11 to the pressure receiving surface 21 of each of the pressurizing sections 20.

Therefore, even in a case where the plurality of members are fastened to each other by the plurality of fasteners 60 having fastener sizes different from each other, it is not necessary to individually adjust a pressure of the oil to be supplied to each of the pressurizing sections 20 simply by selecting whether to open or close the supply valve 25, and thus the burden of the fastening operation can be reduced.

<Modification Example>

Although the operation ends after the fastening of the composite materials 50 (after ST20) in the embodiment, subsequently another fastener 60 may be fastened in a modification example while the pressure in the supply system 30 is maintained at the predetermined pressure Pd.

In the embodiment, the pressurizing pump 11 sets the predetermined pressure Pd to 459 kg/cm$^2$ (45.0 MPa).

In the modification example, the pressurizing pump 11 may maintain the predetermined pressure Pd at a set lower limit value or higher. In this case, the pressurizing pump 11 pressurizes an oil when the predetermined pressure Pd is lower than the set lower limit value.

In another modification example, the pressure in the supply system 30 may be maintained within a certain range in addition to maintaining the pressure to the set lower limit value or higher. For example, the pressurizing pump 11 may maintain the pressure in the supply system 30 such that the predetermined pressure Pd falls within a range of 421 to 459 kg/cm$^2$ (41.3 to 45.0 MPa). In this case, the pressurizing pump 11 stops after temporarily increasing the pressure in the supply system 30 to 459 kg/cm². When the predetermined pressure Pd in the supply system 30 is lower than the lower limit value of 421 kg/cm², the pressurizing pump 11 operates again, and pressurizes the oil until the predetermined pressure Pd in the supply system 30 becomes 459 kg/cm² again.

In the embodiment, each of the pressure receiving surfaces 21 has the individual pressure receiving area Sr according to the fastener size of the corresponding fastener 60. In the modification example, the pressurizing sections 20 may have pressure receiving areas different from each other according to each fastener size.

In the embodiment, as shown in FIG. 5, as the fastener size of the corresponding fastener 60 increases, there are the pressure receiving surfaces 21 having not only the large pressure receiving area Sr but also the small pressure receiving surface Sr. In the modification example, each of the pressure receiving surfaces 21 may be set such that the pressure receiving area Sr increases as the fastener size of the corresponding fastener 60 increases.

Although some embodiments of the present invention have been described hereinbefore, the embodiments are presented as examples and are not intended to limit the scope of the invention. The embodiments can be executed in a variety of other forms, and various omissions, replacements, and changes can be made without departing from the spirit of the invention. As included in the scope and spirit of the invention, the embodiments and the modifications thereof are included in the scope of the invention described in the claims and the scope of equivalents thereof.

INDUSTRIAL APPLICABILITY

According to the aspect, the burden of the fastening operation can be reduced.

REFERENCE SIGNS LIST 1 fastening system
10 centralized pump unit
11 pressurizing pump
11' pressurizing pump
12 return port
20 pressurizing section
20' pressurizing section
21 pressure receiving surface
22 drive unit
22a recessed portion
22b clamp portion
22c pin clamp
22f first surface
22s second surface
23 housing
23a abutting surface
23b main body portion
23f first opening
23s second opening
24 switch
25 supply valve
26 return valve
30 supply system
31 base end
32 branch end
33 switching valve
40 return system
41 base end
42 branch end
50 composite material (member)
51 first composite material
51h first hole
52 second composite material
52h second hole
60 fastener
61 pin
61b base portion
61t tip
62 collar
62b base portion
Dd downward direction
Du upward direction
ST10 step of pressurizing
ST20 step of fastening

The invention claimed is:

1. A fastening system that fastens a plurality of members to each other with a plurality of fasteners having fastener sizes different from each other, the system comprising:
a pressurizing pump that pressurizes a fluid to a set predetermined pressure;
a plurality of pressurizing sections that each have a pressure receiving surface, each are disposed at a position where each of the fasteners is able to be pressurized, and receive the fluid with each of the pressure receiving surfaces to pressurize each of the fasteners; and
a supply system that has a base end connected to the pressurizing pump and a plurality of branch ends connected to the pressurizing sections respectively, branches off from the base end toward the respective branch ends, and is capable of supplying the fluid from the base end to the respective branch ends,
wherein each of the pressure receiving surfaces has an individual pressure receiving area according to the corresponding fastener size, and
the fluid is supplied at the predetermined pressure from the base end to each of the pressure receiving surfaces.

2. The fastening system according to claim 1,
wherein the fastener has a pin and a collar, and
the pressurizing section pulls the pin and caulks the collar.

3. The fastening system according to claim 1,
wherein the predetermined pressure is maintained at a set lower limit value or higher.

4. The fastening system according to claim 1,
wherein the pressurizing pump performs pressurization when the predetermined pressure is lower than a set lower limit value.

5. The fastening system according to claim 1,
wherein each of the members is a composite material.

6. A fastening method of fastening a plurality of members to each other with a plurality of fasteners having fastener sizes different from each other, by using a fastening system including a pressurizing pump that pressurizes a fluid, a plurality of pressurizing sections that each have a pressure receiving surface, each are disposed at a position where each of the fasteners is able to be pressurized, and receive the fluid with each of the pressure receiving surfaces to pressurize each of the fasteners, and a supply system that has a base end connected to the pressurizing pump and a plurality of branch ends connected to the pressurizing sections respectively, branches off from the base end toward the respective branch ends, and is capable of supplying the fluid from the base end to the respective branch ends, in which each of the pressure receiving surfaces has an individual pressure receiving area according to the corresponding fastener size, and the fastening method comprising:
a step of pressurizing the fluid to a set predetermined pressure with the pressurizing pump; and
a step of supplying the fluid at the predetermined pressure from the base end to each of the pressure receiving surfaces and fastening the plurality of members to each other with each of the fasteners.

\* \* \* \* \*